United States Patent [19]

Franklin et al.

[11] 3,927,367

[45] Dec. 16, 1975

[54] BATTERY TESTING APPARATUS
[75] Inventors: David M. Franklin, Lexington; William P. Lane, Taunton, both of Mass.
[73] Assignee: Polaroid Corporation, Cambridge, Mass.
[22] Filed: Oct. 21, 1974
[21] Appl. No.: 516,645

[52] U.S. Cl. .................... 324/29.5; 320/2; 320/48; 340/249
[51] Int. Cl.² ........................................ G01N 27/42
[58] Field of Search ........ 324/29.5; 136/182; 320/2, 320/48; 340/249

Primary Examiner—John Kominski
Attorney, Agent, or Firm—Gerald L. Smith

[57] ABSTRACT

Apparatus for performing an in situ testing of the condition of a battery positioned within a sealed multi-walled package suited for retail distribution, which battery may form a component of a composite photographic film laden cassette assemblage. Upon positioning the package within an appropriate receiving arrangement, relative movement is provided between the package and a pair of testing probes. This relative motion provides for penetration by the probes of a predetermined region of the package at a select angle of attack, preferably substantially perpendicular to the surface of the package penetrated. Following such insertion, the angle of attack of the probes is altered to permit a non-destructive contact between the probes and the terminal defining surfaces of the battery. Indicator means are provided for advising the operator as to the operational status of the battery. A simple hand actuated lever movement provides the noted relative movement.

25 Claims, 7 Drawing Figures

BATTERY TESTING APPARATUS

BACKGROUND OF THE INVENTION

This invention relates to battery status evaluation devices and, more particularly, to apparatus for the in situ testing of batteries packaged within a container suited for distribution through retail outlets.

U.S. Pat. Nos. 3,705,542; 3,543,662; 3,543,663; and 3,595,661 relate to photographic film cassettes which comprise a discardable container enclosing self-developing film units in combination with a battery power supply system. Essentially, the cassette structure described in those patents comprises an opaque enclosure containing a dark slide for covering an exposure station in a top wall thereof, a stack of individual "self-developing" film units positioned behind the dark slide, means for urging the stack of film units toward the top wall to position the uppermost film unit in the stack in the exposure station and an electrical power supply in the form of a flat battery which is held against the internal side of the oppositly located rear wall. The battery is structured having spaced terminal defining metallic surfaces in adjacency with appropriate apertures or openings formed within the rear wall of the structure. Accordingly, when employed in a photographic camera, for instance, similar to that sold by Polaroid Corporation of Cambridge, Massachusetts, U.S.A., under the trade name "SX-70". When the cassette structure is inserted within the camera there is provided a fresh supply of power for operating electrical mechanisms through a series of photographic cycles corresponding with the number of film units in the cassette. Electrical communication between the camera and the noted terminals of the battery is provided upon full insertion of the cassette within the camera, spring biased electrical contact members coming into contact with these terminal surfaces as the cassette becomes fully seated within a receiving chamber thereof.

A photographic cycle for the camera involves a somewhat complex series of operational events, each imposing electrical power demands and each being controlled by an integrated solid state control circuit. As detailed in U.S. Pat. No. 3,774,516, this control circuit monitors several mechanical manipulations of the instrumentalities of the device involving a dual energization of a d.c. dynamoelectric motor, as disclosed in U.S. Pat. Nos. 3,811,081 and 3,731,608, as well as a select multiple energization of exposure regulating tractive electromagnetic drives, as described, inter alia, in U.S. Pat. Nos. 3,791,278; 3,750,543; 3,805,204 and 3,820,128. The operational events carried out by the camera include those of securing an exposure chamber, reflex optical path conversion, automatic regulation of the exposure of the film unit, motor driven film unit removal and processing, as well as removal of the above-noted dark slide positioned at the exposure station of the cassette.

The flat type battery powering the camera throughout the above series of operational events is ideally suited to meet the requisites of its control system. For instance, the battery power supply is required to exhibit a low internal impedance while remaining capable of accommodating for relatively high current drains, in addition to having a multi-cycle capacity. During its powering activity in the course of a photographic cycle, the flat battery is called upon to maintain the predetermined voltage levels required for operating integrated logic control circuits. Accordingly, it is important that the film laden cassettes be delivered to the using public having battery power supplies of proper operational capacity. Generally, such determinations of proper capacity are provided by factory testing the batteries, for instance, for requisite threshold values of closed circuit voltage. Such factory testing is carried out by imposing a predetermined load across the loaded terminals thereof for a short predetermined interval. Those batteries meeting the requirements of the test are inserted within cassettes as a step in the loading thereof. The loaded cassettes then are packaged within a sealed cardboard enclosure suited for retail marketing.

The flat or planar batteries incorporated within the film cassette preferably are primary batteries of the LeClanche type including a zinc anode system, a manganese dioxide cathode system and an aqueous electrolyte of amonium chloride, zinc chloride and usually a small amount of mercuric chloride. Such battery structures have been observed to require storage conditions which ideally correspond with those of the film units incorporated within the cassette. For instance, they preferably are maintained at lower temperatures and within an environment protected from vapor attack and the like. However, while these storage condition requirements may be complimentary, it has been found that the shelf-life characteristics of the battery structures from one production run to another may vary such that certain numbers of them will exhibit a longevity falling below that of the corresponding shelf life of the film with which they are associated. Where the shelf life of the composite film power supply assemblage is confined to the lowest statistically determined shelf life of the battery units therewithin, undue wastage of valuable film as well as battery products may result. Accordingly, it is desirable to provide a film pack evaluation technique accurately reflecting the actual state of the power supply of each film-power supply package.

SUMMARY OF THE INVENTION

The present invention is addressed to apparatus for testing the operational suitability of batteries incorporated within a package suited for retail distribution, for instance, a package incorporating a film cassette having a self-contained battery power supply. Such testing is carried out in situ without destruction of the structural integrity of the carboard or equivalent material utilized to form the package. Accordingly, with the arrangement of the invention, the product shelf life characteristics of a composite film-battery supply cassette may be evaluated at a more optimum point in the life span of the product.

Specifically, the containers within which such composite structures are packaged are provided having a rectangular parallelopiped configuration, the major dimension of which covers the corresponding major dimension of the cassette structure and the minor dimension or height of which surrounds the side walls of the cassette. In accordance with the invention, access to the internal portion of an internally disposed cavity within the outer container is effected by an initial penetration of a side wall thereof of minor dimension by substantially non-destructive test probes having an angle of attack generally perpendicular to such surface of minor dimension. Inasmuch as a functional taper generally is imparted to the noted composite cassette structure to define a free volume within the packaging arrangement, tolerances are available for the mechanism providing for relative movement between the probes and the cassette retaining container. Accordingly, insertion into the container is availed in a manner wherein no significant opportunities for damage to the cassette and battery structure are present.

The apparatus of the invention further is characterized in providing for an alteration of the noted probe angle of attack following initial penetration of the package such that probe contact with the noted terminal surfaces of the cassette retained battery is made as a sliding contact, thereby assuring proper electrical contact and in a manner non-destructive to such surface.

Another object and feature of the invention is to provide for probe insertion of the container utilizing a receiver housing for the package in the form of a carriage which, when driven from an actuator, provides for relative movement between the film container and the probe device. Upon full and proper insertion of the testing probes, a test circuit evaluates the closed circuit voltage characteristic of the battery and an indication of battery quality is supplied through an indicator light or the like.

Other objects of the invention will in part be obvious and will in part appear hereinafter.

The invention accordingly comprises the apparatus possessing the construction, combination of elements and arrangement of parts which are exemplified in the following detailed disclosure.

For a fuller understanding of the nature and objects of the invention, reference should be had to the following detailed description taken in conjunction with the accompanying drawings.

DETAILED DESCRIPTION OF THE DRAWINGS

Figure 1:
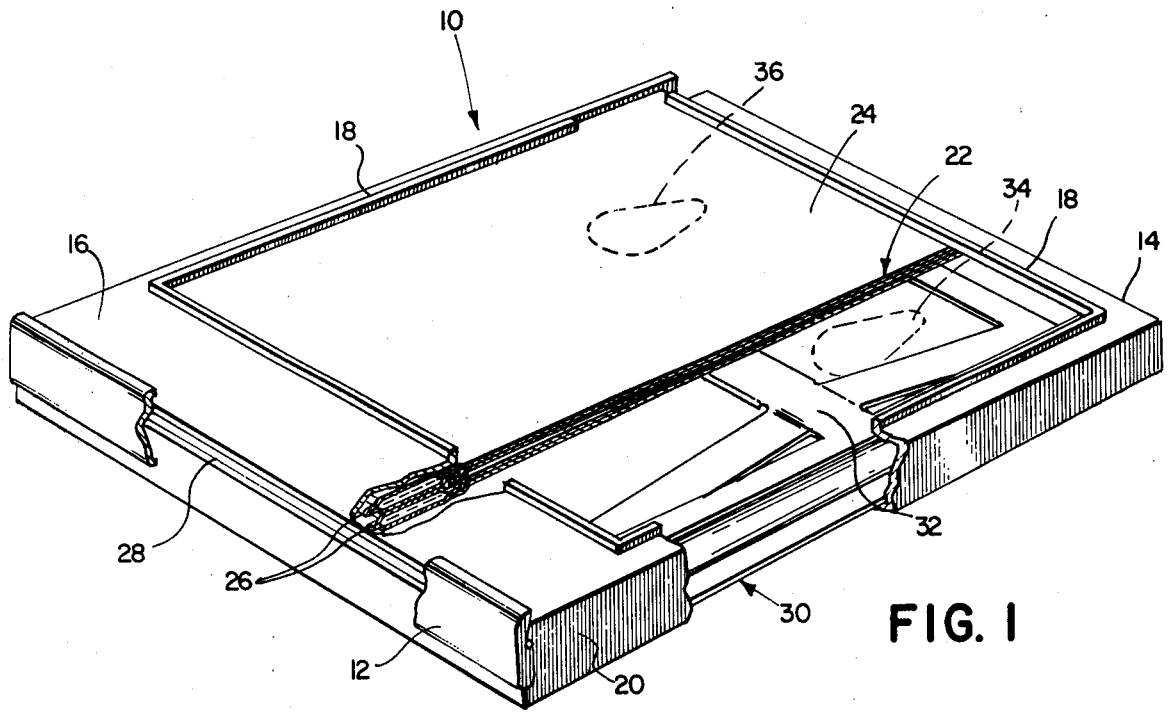
FIG. 1 is a perspective view of a photographic film cassette incorporating a planar primary battery, portions of the view being cut away to reveal internal structure.

Referring to FIG. 1, a composite photographic film cassette, the battery component of which may be tested utilizing the apparatus of the invention, is revealed in perspective. The cassette generally is formed to taper somewhat from its forward wall 12 to the rear wall 14 thereof. The top surface or wall 16 of cassette 10 is formed having an exposure access opening defined by a ridge 18 formed integrally therein. One side wall having a tapering dimension between forward wall 12 and rear wall 14 is shown at 20. Located beneath top surface or wall 16 is a stacked supply of film units, shown generally at 22.

Each of these film units, as stacked at 22, is of a "self-developing" variety, sometimes described as an integral negative-positive film unit having as essential elements, a photosensitive element having a photosensitive system for providing a diffusion transfer image pattern, an image-receiving element, an opacification system and a rupturable container holding a processing composition. In the drawings, the photosensitive portions of the film units are represented generally at 24, while the pods or rupturable containers holding processing solution are represented at 26. Generally, a full film supply for the composite cassette 10 will amount to a stack of ten individual film units. Prior to use, a dark slide (not shown) is positioned over the uppermost film unit to preclude the passage of actinic radiation through the exposure opening defined by ridge 18. The dark slide is removed as an initial operational event in the positioning and locking of the cassette structure within a camera.

The elements of the film units as at 24 are integrated such that upon distribution of processing composition within an exposed unit, a diffusion transfer image is derived in the image-receiving element which is viewable against a reflective background without separation procedures or the like. The film units are adapted for processing outside a camera within which they are exposed, since effective protection against further exposure is provided by way of the opacification which, in some integral negative-positive film units, is integrated with the unit prior to exposure of photosensitive system while, in another, the opacification system is integrated with the system after exposure. In the preferred integral negative-positive film units the opacification system comprises a combination of light-absorbing dyes and a light-reflecting material or pigment and this combination is included in the rupturable container and distributed between the photosensitive and image-receiving elements after exposure. Further details relative to the integral negative-positive film units may be found in U.S. Pat. Nos. 3,415,644; 3,415,645; 3,415,646 and 3,647,437, among others. Upon stacking, the pods as at 26 require a greater stacking height than the remaining portions of the integral film units. Essentially for this reason, the noted taper is present along the general front to back structure of the cassette.

Leading or forward wall 12 is formed having a generally rectangular slot or exit orifice 28 which serves as a passage through which exposed uppermost ones of the film units at 24 may be individually withdrawn. A flap 29 covers this slot prior to insertion of the cassette within a camera.

The battery of the composite cassette 10 is positioned on the lower interior surface thereof and is shown generally at 30. As disclosed in the aforementioned U.S. Pat. No. 3,543,662, cassette 10 additionally includes a spring loaded platform 32 positioned intermediate the lowermost one of the film units at 24 and the upward facing surface of battery 30. Platform 32 serves to compressively retain battery 30 and the lower facing terminal surfaces thereof in aligned adjacency against terminal openings shown in phantom at 34 and 36 and formed within the lower or bottom wall of cassette 10. These openings are located so as to permit contact between terminal defining surfaces of the battery 30 and appropriate spring-biased power supply contacts of the camera. In normal usage, following exhaustion of all film units at 24 within the cassette structure, the assembly, including battery 30, is discarded.

Figure 2:
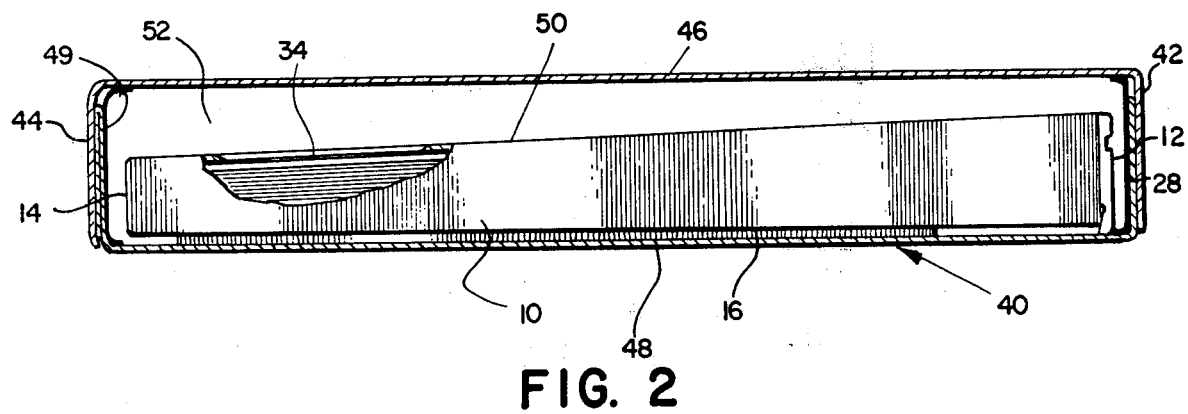
FIG. 2 is a partially sectioned view of the composite cassette structure of FIG. 1 showing, in partial section, its orientation within a protective package.

Looking to FIG. 2, the orientation of cassette 10 within a container or package suited for retail marketing is revealed generally as a package assemblage 40. The outer package around composite cassette 10 may assume a variety of configurations and be formed of any of a variety of suitable materials, for instance, cardboard. For the instance purposes, the container is shown as a rectangular parallelepiped having end walls 42 and 44 and top and bottom walls shown, respectively, at 46 and 48. A hermetic seal 49 is provided about all internal surfaces of the package. Note that top wall 46 extends over the bottom wall of cassette 10, now shown at 50. With this arrangement, the terminal openings at 34 and 36 within bottom wall 50 of cassette 10 face upwardly toward top wall 46 of the container. Further, the tapered dimension of cassette 10 as it extends from forward wall 12 to rearward wall 14, provides for the presence of a cavity or open or free volume portion 52 intermediate the rearward portion of cassette 10 and the internal surface of wall 46 of the container. It is this free volume within the package assemblage 40 which is penetrated for purposes of testing the power supply status of battery 30.

Figure 3:
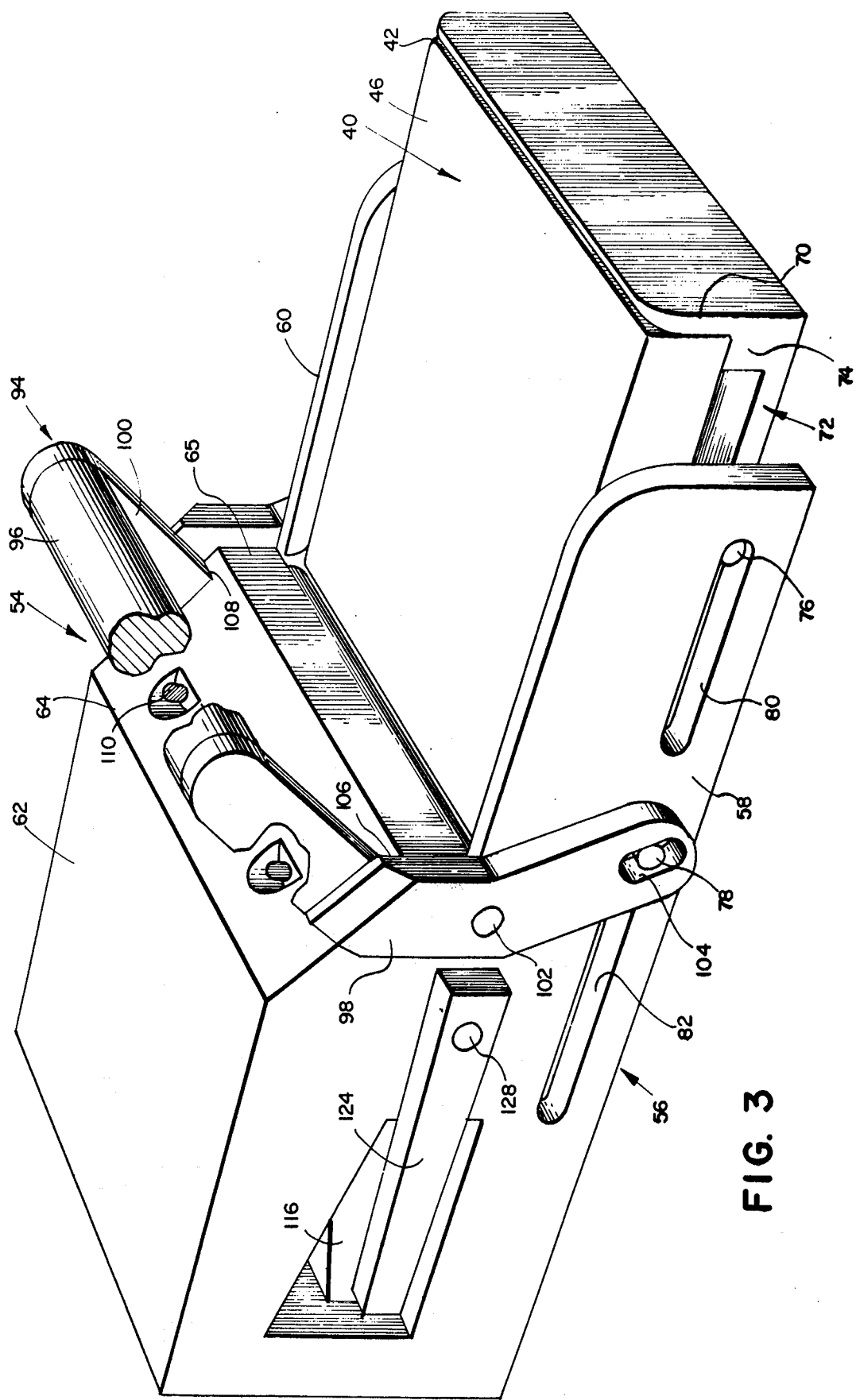
FIG. 3 is a perspective view of apparatus according to the invention showing the orientation of a packaged film unit preparatory to the testing of the battery therewithin.

Referring to FIG. 3, the apparatus for testing this packaged assembly 40 is revealed generally at 54. Testing apparatus 54 includes a basic support structure 56 formed having side walls 58 and 60 along the top walls 62 and 64, and forward wall 65.

Figure 4:
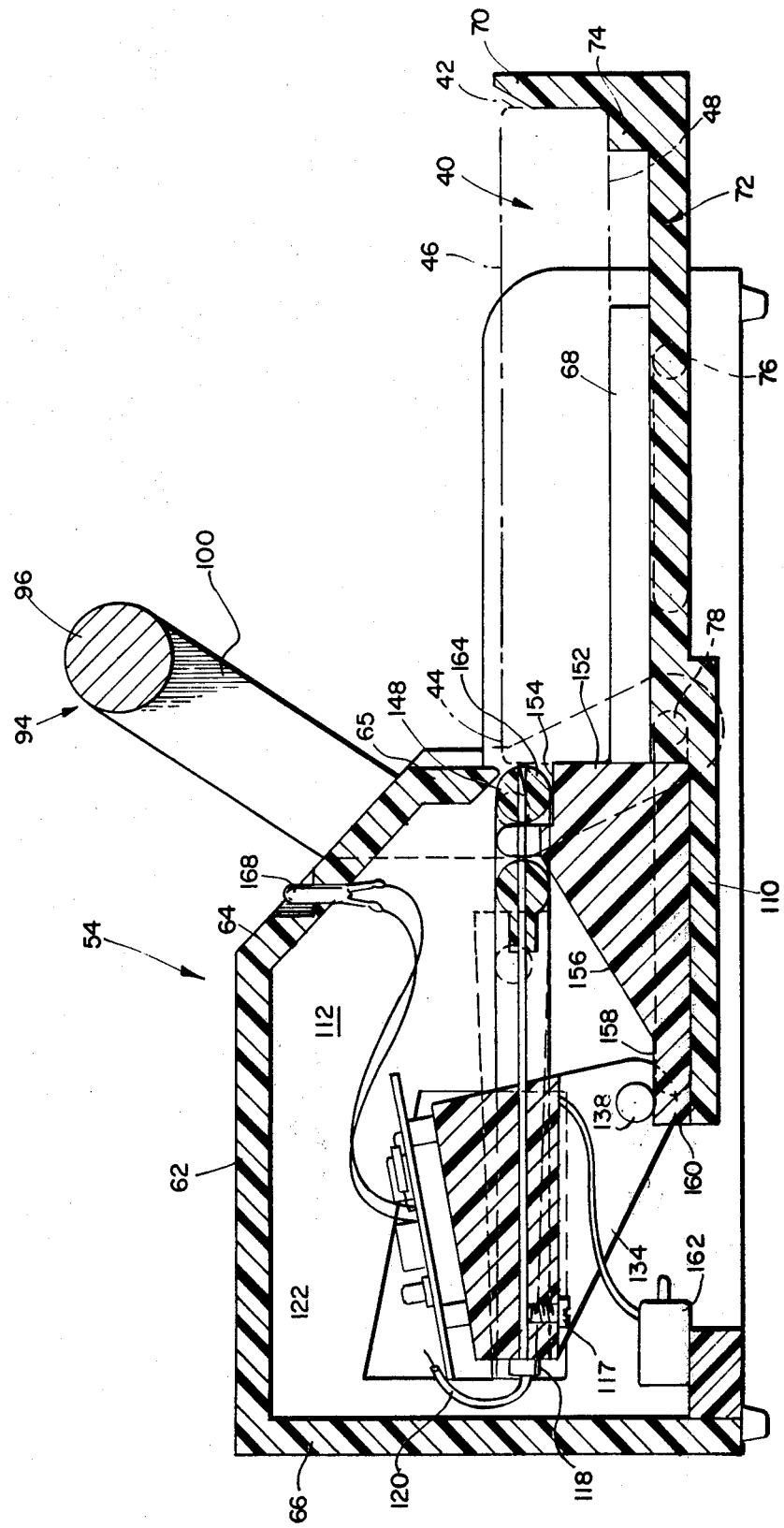
FIG. 4 is a sectional view of the apparatus of FIG. 3, showing the orientations of the components thereof prior to the evaluation of a battery located within a packaged composite film cassette.
Figure 5:
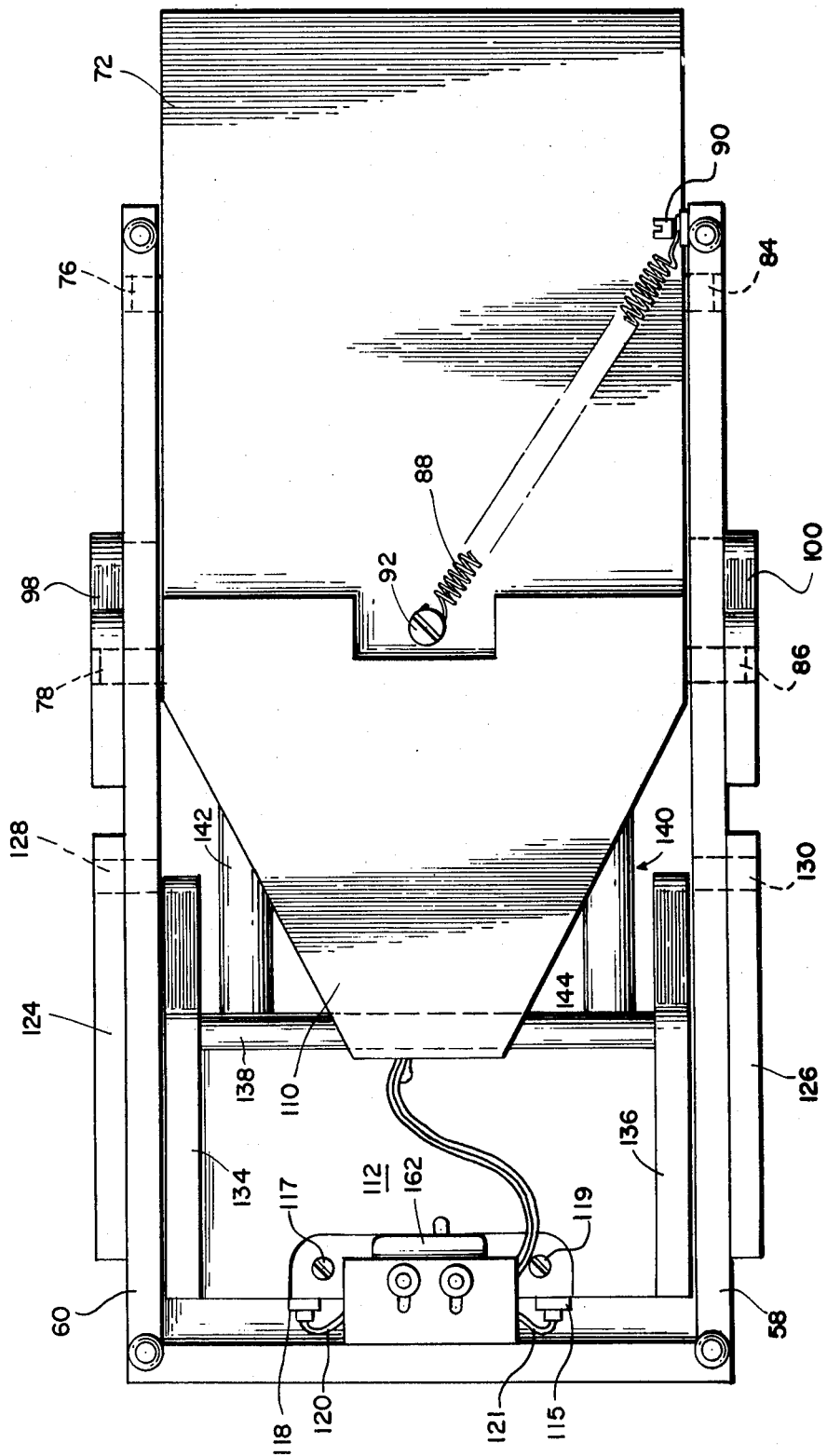
FIG. 5 is a bottom view of the apparatus of FIG. 3.

Referring additionally to FIGS. 4 and 5, positioned intermediate walls 58 and 60 at the forward end of the device is a supporting platform 68 which is adapted to slidably receive bottom wall or side 48 of the package or film assemblage 40. As is apparent from the figures, when the film package 40 is positioned within the receiving chamber, or area defined by walls 58 and 60 and supporting platform 68, the assembly 40 is oriented for appropriate insertion within the testing apparatus 54. Further defining this receiving chamber or portion, when the apparatus 54 is in the orientation shown at FIGS. 3 and 4, a wall 70 of a carriage assembly 72 nests against package wall 42. A rectangular seating filet 74 is provided forwardly of rear wall 70 to provide a seating surface for the end portion of container 46. In this regard, the upper surface of filet 74 is coplanar with the upper supporting surface of platform 68.

Carriage assembly 72 is mounted for slidable movement toward and within that portion of apparatus 54 covered by walls 62, 64 and 65. Such mounting is provided by the slidable mounting of pins as at 76 and 78 fixed to and extending from carriage 72 and slidably mounted within corresponding slots shown, respectively, at 80 and 82 formed within wall 58. As shown in FIG. 5, an identical mounting is provided on the opposite side of apparatus 54 by pins 84 and 86 extending through the slots corresponding with those depicted at 80 and 82. As further depicted in the same figure, carriage assembly 72 is biased for movement outwardly to assume the orientation shown in FIGS. 3 and 4 by a spirally wound spring 88 extending between mounting screw 90 attached to wall 58 and mounting screw 92 attached to the under side of carriage assembly 72.

Returning to FIGS. 3 and 4, apparatus 54 also is seen to include a hand actuated lever, shown generally at 94, formed having a cylindrical grip 96, the ends of which are fixed to levers 98 and 100. It may be desirable to design the lever arrangement 94 such that the operator is encouraged to push it downwardly from the top as opposed to grasp it. With such an arrangement, the operator would be encouraged not to curl his fingers or thumb around the grasping portion 96 such that an interference with film package 40 in the fully downward position would be encountered. Levers 98 and 100 are journaled for pivotal movement over pins extending, respectively, from side walls 58 and 60. In this regard, such a pin 102 is shown in FIG. 3 extending from wall 58. The lowermost portion of each of levers 98 and 100 is slidably connected to carriage assembly 72 by pin and slot connections, one slot of which is shown at 104 engaging extended pin 78. A pin 86 depending from carriage assembly 72 engages an appointed slot (not shown) in lever 100. The slots as at 104 are elongate in configuration to accommodate for pivotal movement of the hand actuated lever assembly 94. The upward travel of lever assembly 94 is limited by the configuration of its levers 98 and 100. Note in this regard, that the levers are formed having seating surfaces as at 106 and 108 which abut against top wall 64 of the apparatus 54. Alternately, the slots as at 80 or 82 may be configured to limit the motion of the carriage assembly 72 which, as noted above, is coupled with the lower tip portions of levers 98 and 100. The lever 94 is biased into such abuting contact with top wall 64 in consequence of the tension of spring 88 urging carriage assembly 72 into the orientation of FIGS. 3 and 4 which, in turn, translates such directional bias through pins 78 and 86.

On the proper insertion of a film package 40 as shown in FIGS. 3 and 4, the cylindrical grip 96 of hand actuated lever 94 is grasped by the operator and, with a simple one-handed motion, the lever is pivoted about pins as at 102 in a downward direction to, in turn, drive carriage assembly 72 inward by virtue of its connection with assembly 94 at pins 78 and 86. The film package 40 now slides inwardly into the rearward and protected portion of the apparatus as defined by rear wall 66, top walls 62, 64 and 65 and the inner rearward portion of side walls 58 and 60. Note that the bottom edge of wall 65 assumes the vertical positioning of package 40. The chamber defined by the noted walls is identified by the numeral 112.

As is revealed in FIG. 4, chamber 112 contains two metal probes or contact members, one of which is revealed at 114, which are coplanar, parallel and mutually spaced such that, when injected through the top portion of end wall 44 of the package assembly 40, they are aligned for ultimate contact with the terminal electrode surfaces of battery 30 lying beneath openings 34 and 36 of cassette 10. The probes, as at 114, are fixedly mounted to and extend from the rearward portion of a tilt block 116. For this mounting, set screws 117 and 119 are provided. Inasmuch as the inner lining as at 49 of the film assemblage may be formed as a foil or similarly electrically conductive material, it is necessary to electrically insulate those portions of the surfaces of the probes which abut against the penetrated foil. Such insulation may, for instance, be provided as a polymeric or epoxy coating over the cylindrical surfaces of the probes. Of course, other suitable and wear resistant materials may be incorporated in structuring the probe members. A corrosion resistant quality for the coating also may be found desirable. Connection between the probes as at 114 with the tilt block 116 is provided by collet connectors shown at 118 and 115 (FIG. 5). Connectors as at 118 and 115 are fixed both to tilt block 116 and the appropriate probes and are electrically conductive for providing communication, respectively, as by leads 120 and 121 to a circuit board shown generally at 122. As is revealed more clearly in FIGS. 3 and 5, each respective side of tilt block 116 is fixedly mounted to a pivotal bar or lever 124 and 126. Levers 124 and 126, in turn, are pivotally mounted to side walls 58 and 60 through pins 128 and 130. As will be revealed in more detail later herein, the positioning of the pivot point for levers 124 and 126 is important to the design of the apparatus. More particularly, this pivot point is selected as being present at that location represented by forward wall 44 of the package 40 when the angle of attack of probes as at 114 is alterned to effect the contact thereof with corresponding terminal defining surfaces of the battery.

Looking in more detail to the shape of tilt block 116, note that it is formed having a more or less solid central portion surmounted on each side by two downwardly extending side protrusions as at 134 and 136. These protrusions serve to support a cam follower rod 138 which extends transversely across the assembly. It will be apparent that, by driving rod 134 upwardly, the entire tilt block assembly will pivot about pins 128 and 130.

Figure 6:
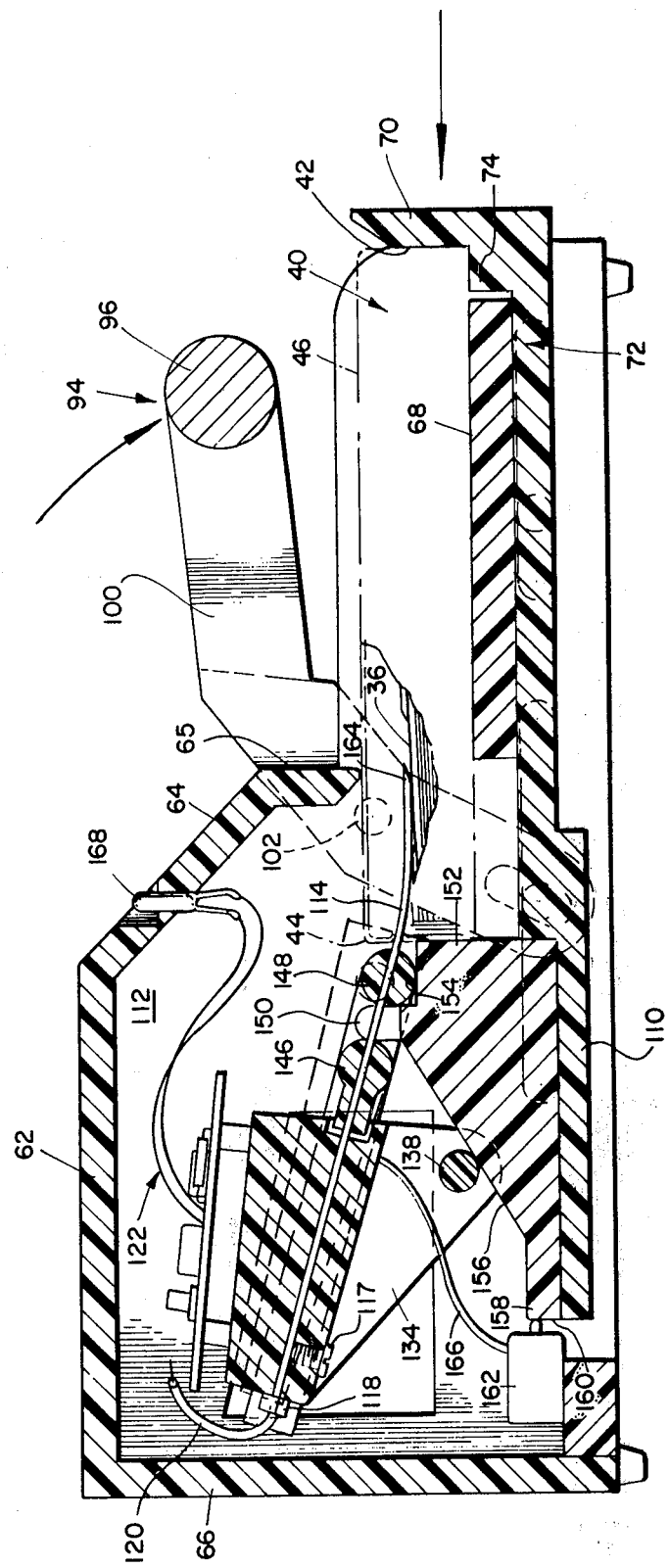
FIG. 6 is a sectional view of the apparatus of FIG. 3, showing the orientation of the components thereof during an interval of battery testing.

The battery testing probes as at 114 are supported substantially throughout their length by a slider support bracket depicted generally at 140. Bracket 140 is formed having two cylindrical probe support members which are slidably mounted within and supported from tilt block 116. Further, members 142 and 144 are formed having an internal bore within which probes as at 114 are mounted. The forward portions of support members 142 and 144 are joined together by spaced cylindrical cross supports 146 and 148 (FIGS. 4 and 6). Cross supports 146 and 148 are so mutually spaced as to form a very loose pivot connection with upstanding protrusion 150 extending from a cam block 152. Block 152 is formed having a horizontally disposed surface 154 formed beneath the lowermost portion of cross support 148, a cam rising profile surface or stage 156 and cam dwell surface or stage 158. Block 152 is fixed to the extended portion 110 of carriage 72 and is elevated thereabove a distance sufficient to provide a vertical actuating surface 160 which serves to trip a microswitch 162 upon movement of carriage assembly 72 to its rearwardmost or limiting position.

Looking to FIG. 4, as hand actuated lever 94 is pulled downwardly, carriage 72 commences to move inwardly in consequence of its connection with levers 98 and 100. Accordingly, package 40 is driven over the top surface of supporting platform 68 under wall 65 and in alignment with side walls 58 and 60 by carriage wall 70. Simultaneously, cam block 152 is moved rearwardly such that its dwell portion 158 slides beneath follower rod 138. Upstanding protrusion 150 engages cross support 146 to drive slider support bracket 140 rearwardly into receiving bores within tilt block 116. Accordingly, the forward portion or tips of the probes as at 114 become exposed. One such tip portion is revealed at 164. While cam follower rod 138 rides upon dwell portion 158 of cam block 152, the probes as at 114 will retain a substantially horizontal orientation and will penetrate the top region of rear wall 44 of the assemblage or package 40. As described in conjunction with FIG. 2, this uppermost portion of wall 44 opens to a cavity or clear space 52 above the cassette structure 30. Note that broad tolerances are available for this initial penetration and that the substantially horizontal orientation of the penetrating probes assures no inadvertent contact with the walls as at 14 of cassette 30, as well as provides a more stable compressive stress arrangement for the probes.

Looking additionally to FIG. 6, as cam follower rod 138 contacts rising profile portion or stage 156 of cam block 152, tilt block 116 pivots about pins 128 and 130 by virtue of its coupling therewith through levers 124 and 126 to commence to alter the angle of attack of the probes as at 114. As noted earlier, this alteration of the angular attack of the probes takes place about a pivot point defined by forward wall 44 of the package 40 as it is now oriented within the apparatus. Recall at this juncture, that pins 128 and 130 of the assembly were located to provide for this point of angular alteration of the probes. With the arrangement, no undue strains are exerted upon forward wall 44 or the mechanism inserting the probes within the package assembly 40, inasmuch as the coupling between cross supports 146 and 148 with protrusion 150 is very loose. Accordingly, the noted particular location of the pivot point for altering the angle of attack is accommodated for. It further may be noted that surface 154 of tilt block 116 is located so as not to interfere with cross support 148 during the pivoting activity.

The probe members, having entered chamber 58, take on a downward arcuate movement and approach the terminal defining surfaces of battery 30. Accordingly, contact with the terminal surfaces is made with a gentle downward and slightly sliding motion. No damage is occasioned at the terminal surfaces. It may be noted from FIG. 4 that the tip as at 164 of the probe as at 114 is shaped so as to provide an upwardly disposed point for insertion within end wall 44 and a taper depending therefrom to improve its angle of attack at the battery terminal surface.

Of course, other appropriate tip shapes may be utilized. For instance, a bullet shaped tip portion will be operative for the intended purpose. When the tips of the probes is at 114 make contact with the terminal defining surfaces of the battery within the assembly 40, a modicum of compliance at the terminal surface is provided which permits the surface to depress slightly. Recall from the description of the cassette structure 10 in FIG. 1 that a spring platten 32 resides intermediate the stacked film assembledge 22 and battery structure 30. With this compliant nature of the structure factored into the instant design, assurance of proper electrical contact is realized.

As carriage 72 is driven to approach its limiting rearward orientation, surface 160 of cam block 152 strikes the contact of a microswitch 162. This switch, acting through leads as at 166, serves to activate the battery test control circuit at 122. Inasmuch as a sliding and full electrical contact will have been effected between the terminal surfaces of the battery and the probes as at 114, the actuation of switch 162 takes place at a point in time appropriate to activate a testing circuitry. For instance, should the circuit be activated simultaneously with initial probe contact at the battery, spurious noise signals and the like adversely affecting the measuring technique may be encountered. In the presence of a battery not having an adequate value for closed circuit voltage (C.C.V.), an indicator lamp, present for instance, as a light-emitting diode (L.E.D.) as at 168 will be illuminated to apprise the operator of the presence of the poor battery. As shown in FIG. 1, dual indicator lamps as at 168 and 170 may be utilized with the device, one lamp 170, apprising the operator of the presence of a good battery, the other lamp apprising of the presence of a battery not exhibiting an adequate closed circuit voltage threshold value. It will be apparent that only one lamp, that showing the presence of a good battery, need be utilized with the device.

Figure 7:
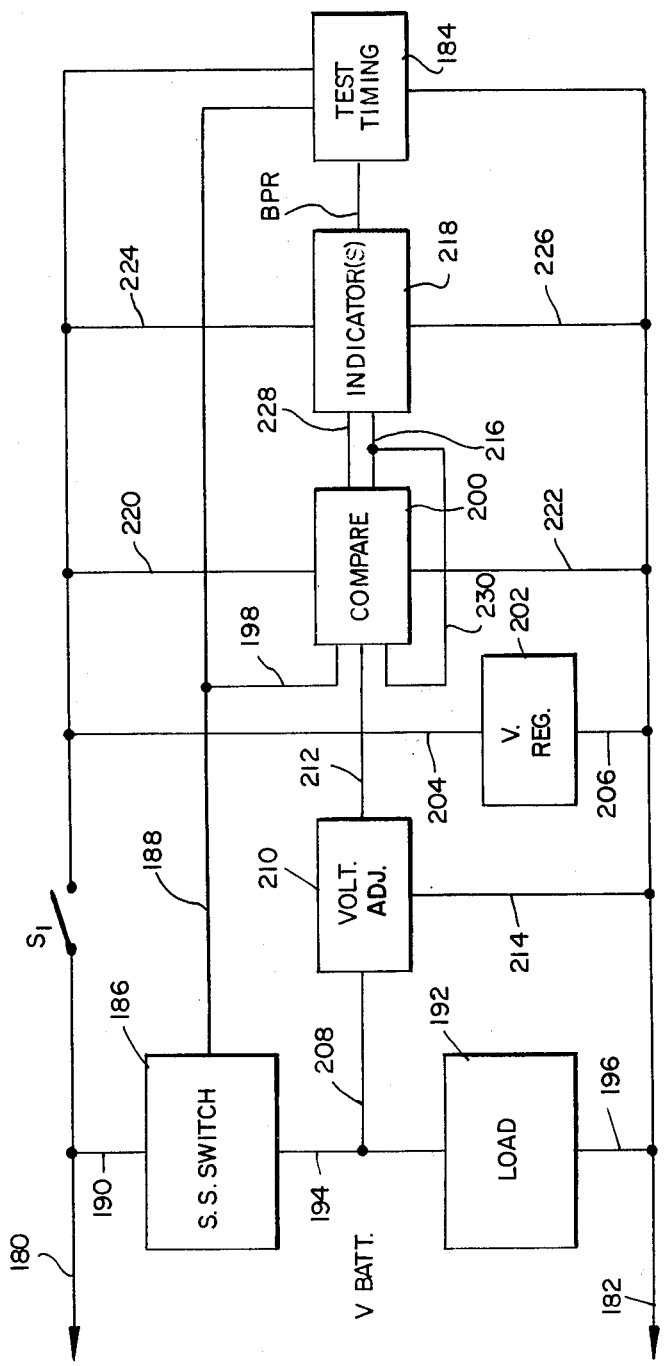
FIG. 7 is a block schematic diagram of circuit utilized in performing a battery test evaluation utilizing the apparatus of the invention.

Turning to FIG. 7, a schematic representation of a circuit which may be utilized with the device is revealed. Such a circuit is described in detail in a copending application for U.S. patent by Richard P. Williamson, Ser. No. 516,644, filed of even date herewith, entitled "Battery Testor and Circuit" and assigned in common herewith.

Points representing the probes or terminal contact members, one of which has been described, for instance, at 114 in FIGS. 4 and 6, are represented in the instant drawing at locations 180 and 182. These lines further represent the main power input leads of the circuit. When the probes are located and substantially stationary upon the terminal defining surfaces of the battery, microswitch 162 is closed by interaction with surface 160 of carriage 72 (FIGS. 4 and 6). This microswitch is represented in FIG. 7 by the switch $S_1$. Accordingly, upon the proper manipulation of the film package 40 to close switch $S_1$, the circuit is enabled to activate a test timing function represented by block 184. Function 184, coupled between leads 180 and 182, commences to timeout an interval suitable for imposing a test load across the output of the battery being tested. Without such timing, the battery may be unduly depleted. Accordingly, about a 100 millisecond timing interval is provided. The activation of timing function 184 also activates a solid state switch 186 through line 188. Coupled to line 180 through line 190 and to a load 192 through line 194, switch 186 permits the sampling of closed circuit voltage at the tested battery. Note that load 192 is coupled to lead 182 through line 196. The load at 192 is selected to correspond with that demanded in a course of the typical photographic cycle of the abovedescribed camera. Function 184, operating through line 198 also serves to hold off or disable a comparison type circuit 200 during the noted sampling interval.

At the conclusion of the sampling interval, comparison function 200 is activated from line 198 and switch 186 terminates the imposition of load 192 across the terminals of the battery. Operative as a threshold responsive device, comparing function 200 utilizes a voltage from line 180 as that voltage is regulated from a regular function 202 coupled to line 180 to line 204 and to line 182 from line 206. This regulation is required inasmuch as the battery itself provides the power for the overall testing circuit. The voltage level to be evaluated is derived from line 208, whereupon it is introduced to voltage adjusting function 210, thence to comparison function 200 from line 212. Voltage adjusting function also is coupled to line 182 through line 214. This function 210 is present to derive a requisite ratio of regulated voltage to input voltage preselected to trip the input stage of function 200 when the voltage level at line 208 equals or exceeds a predetermined acceptable level.

Assuming the presence of such as acceptable level, the output of function 200, present at line 216, is introduced to drive a selected indicator within an indicator function 218. This function may, for instance, be present as the light-emitting diode shown at 168 in FIGS. 3, 4 and 6. In a preferred arrangement of the invention, only one such indication is provided to show the presence of a good battery, a battery not meeting test requirements failing to illuminate any indicator function whatsoever. Note that comparison function 200 is coupled between leads 180 and 182, respectively, by lines 220 and 222, while indicator function 218 is connected between the same leads, respectively, by lines 224 and 226.

In the event it is desired to provide an indication of a battery having some power but an output threshold level below that required for the intended utilization, an indicator such as described at 170 in FIG. 3, i.e., an L.E.D. may be activated by comparison function 200. This activation may be carried out from line 228. However, with such a dual signaling arrangement, it is necessary to provide appropriate clamping and bypass procedures. For instance, line 216 would also serve to activate a bypass of the activating lines leading to the indicator L.E.D. representing a poor battery in the presence of a good battery. Additionally, a clamp as provided at line 230, extending from output line 216 to the input of function 200, serves to maintain the illumination of the indicator lamp signaling the presence of a good battery. Without such clamping arrangements or the like, this signal would turn off following a short decay interval commensurate with a switching off of function 186.

Where additional storage of the film package following testing according to the instant invention is contemplated, the small punctures made in the inner hermetic seal 49 may be resealed. Such resealing will provide protection against humidity excursions and like phenomena. Sealing may be carried out by the simple expedient of opening an outer cardboard flap of the package and covering the punctures with an appropriate adhesively adhering tape. Alternately, the seal itself may be formed incorporating a self-sealing elastomer, for instance, a tacky or soft rubber polymer having a low second order transition point.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for testing the condition of a battery located within a multi-walled package and having spaced terminal defining surfaces of opposed polarity in predetermined orientation within said package, comprising:

probe means insertable through a select wall of said package for establishing electrically conducting contact with said terminal surfaces;

receiver means for removably receiving said package in a predetermined orientation aligning said select wall for said probe means insertion;

actuator means for providing relative movement between said multi-walled package means and said probe means to effect said probe means contact; and means electrically connectable with said probe means for indicating the condition of a said battery, the said terminal defining surfaces of which have been contacted by said probe means.

2. The apparatus of claim 1 in which said probe means is operative to initially penetrate said select wall at a first angle of attack with respect thereto and to alter said angle of attack to effect said electrically conducting contact with said terminal surfaces.

3. The apparatus of claim 2 in which said probe means first angle of attack is substantially perpendicular to said select wall of said package.

4. The apparatus of claim 1 which said receiver means includes a fixed planar surfaced platform and at least one aligning surface perpendicular thereto for receiving said package and orienting said select wall for insertion by said probe means at a location permitting said terminal defining surface contact.

5. The apparatus of claim 4 in which said actuator means is operative, when actuated, to slidably urge said package into penetrating engagement with said probe means.

6. The apparatus of claim 5 in which said actuator means includes means abuttable against a wall of said package opposite said select wall for urging said package into said penetrating engagement with said probe means.

7. The apparatus of claim 6 in which said relative movement is effected only by slidable movement of said package by said actuator means, and said probe means is angularly moveable to effect said electrically conducting contact subsequent to said insertion.

8. The apparatus of claim 1 in which said probe means includes contact members insertable through said select wall; and slidable support means for providing support to said contact members and moveable along said contact members in correpondence with said relative movement.

9. The apparatus of claim 1 in which said probe means is angularly moveable to effect said electrically conducting contact subsequent to said insertion, and includes at least one contact member having a tip portion configured for initial penetration of said select wall and for subsequent non-destructive contact with a said terminal defining surface.

10. The apparatus of claim 1 in which said actuator means comprises hand driven carriage means operative, when actuated, to effect said relative movement between said package and said probe means and, to selectively drive said probe means to alter the angle of attack thereof with respect to said select wall.

11. The apparatus of claim 10 in which said probe means is mounted for pivotal movement to effect a select alteration of attack thereof with respect to said select wall and includes a cam follower portion; and said carriage means includes cam means having a surface portion moveable into driving contact with said cam follower portion upon said actuation thereof.

12. The apparatus of claim 11 in which said cam means surface portion includes a dwell stage for effecting a probe means initial angle of attack substantially perpendicular to said select wall, and a rising profile stage for altering said angle of attack subsequent to initial insertion of said probe means through said select wall.

13. The apparatus of claim 1 including:
a fixed planar surface platform and at least one aligning surface perpendicular thereto for receiving said package and orienting said select wall for insertion by said probe means at a location providing for said terminal defining surface contact; and
wherein said probe means is operative to initially penetrate said select wall at a first angle of attack with respect thereto and, subsequently, to alter said angle of attack to effect said electrically conducting contact with said terminal surfaces.

14. The apparatus of claim 13 in which said probe means first angle of attack is substantially perpendicular to said select wall of said package.

15. The apparatus of claim 1 in which:
said probe means is operative to initially penetrate said select wall at a first angle of attack with respect thereto and to alter said angle of attack to effect electrically conducting contact with said terminal surfaces; and
said actuator means is operative, when actuated, to slidably urge said package into penetrating engagement with said probe means.

16. The apparatus of claim 15 in which said probe means first angle of attack is essentially perpendicular to said select wall of said package.

17. The apparatus of claim 15 in which said actuator means includes means abuttable against a wall of said package opposite said select wall for urging said package into said penetrating engagement with said probe means.

18. The apparatus of claim 16 in which said probe means includes contact members insertable through said select wall; and
slidable support means for providing support to said contact members and moveable along said contact members in correspondence with said relative movement to permit insertion of said contact members through said select wall.

19. The apparatus of claim 1 in which:
said actuator means comprises carriage means operative, when actuated, to effect said relative movement between said package and said probe means and including cam means having a selectively configured surface portion; and
said probe means is mounted for pivotal movement to effect a select alteration of the angle of attack thereof with respect to said select wall and includes a cam follower portion drivable from said cam means surface portion of said carriage means to effect said alteration of angle of attack.

20. The apparatus of claim 19 wherein said probe means includes at least one contact member having a tip portion configured for initial penetration of said select wall and for subsequent non-destructive contact with the said terminal defining surface.

21. The apparatus of claim 19 in which said cam means surface portion includes a dwell stage for effecting a probe means initial angle of attack substantially perpendicular to said select wall, and a rising profile stage for altering said angle of attack subsequent to initial insertion of said probe means through said select wall.

22. The apparatus of claim 21 which includes a fixed planar surface platform and at least one aligning surface perpendicular thereto for receiving said package and orienting said select wall for insertion by said probe means at a location providing for said terminal defining surface contact.

23. The apparatus of claim 22 in which said probe means includes contact members insertable through said select wall, and slidable support means for providing support to said contact members and moveable along said contact members in correspondence with said relative movement.

24. The apparatus of claim 23 in which said carriage means is operated, when actuated, to slidably urge said package into penetrating engagement with said probe means; and said probe means pivotal mounting is stationary with respect to said package movement.

25. Apparatus for testing the condition of a battery located within a multi-walled package and having spaced terminal defining surfaces of opposed polarity in predetermined orientation with respect to a select wall within said package, comprising;

probe means insertable through said select wall of said package, for establishing electrically conducting contact with said terminal surfaces, said probe means being configured to initially penetrate said select wall at a first angle of attack with respect thereto and to alter said angle of attack by pivotal movement at said select wall to affect electrically conducting contact with said terminal surfaces;

receiver means for removably receiving said package in a predetermined orientation aligning said select wall for said probe means insertion;

actuator means for providing a relative movement between said multi-walled package and said probe means to effect said contact; and means electrically connectable with said probe means for indicating the condition of a said battery, the said terminal defining surfaces of which have been contacted by said probe means.

\* \* \* \* \*